(12) United States Patent
Liu

(10) Patent No.: US 12,299,643 B2
(45) Date of Patent: May 13, 2025

(54) ACCEPTANCE-BASED MEETING INSIGHTS AND ACTION RECOMMENDATIONS

(71) Applicant: Microsoft Technology Licensing, LLC, Redmond, WA (US)

(72) Inventor: Yaming Liu, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 159 days.

(21) Appl. No.: 17/700,471

(22) Filed: Mar. 21, 2022

(65) Prior Publication Data

US 2023/0297969 A1 Sep. 21, 2023

(51) Int. Cl.
*G06Q 10/1093* (2023.01)
(52) U.S. Cl.
CPC ............................... *G06Q 10/1095* (2013.01)
(58) Field of Classification Search
None
See application file for complete search history.

(56) References Cited

U.S. PATENT DOCUMENTS

| | | | |
|---|---|---|---|
| 7,974,871 B2 | 7/2011 | Oral et al. | |
| 10,382,538 B1* | 8/2019 | Chummun | G06Q 30/0239 |
| 10,922,663 B2* | 2/2021 | Chittaluru | G06Q 10/1095 |
| 2009/0125365 A1 | 5/2009 | Masselle et al. | |
| 2012/0150581 A1 | 6/2012 | Mcphail | |
| 2013/0080262 A1* | 3/2013 | Scott | G06Q 30/02 |
| | | | 705/14.68 |

(Continued)

FOREIGN PATENT DOCUMENTS

| | | | | |
|---|---|---|---|---|
| AU | 2013200916 B2 * | 9/2014 | ......... | G06F 21/6218 |
| CA | 2932110 A1 * | 6/2015 | ........... | G06F 19/322 |

(Continued)

OTHER PUBLICATIONS

Stewart, Mamie Kanfer, and Tai Tsao. Momentum: Creating Effective, Engaging, and Enjoyable Meetings. Austin, TX: Lioncrest Publishing, 2017. (Year: 2017).*

(Continued)

*Primary Examiner* — Thomas L Mansfield
(74) *Attorney, Agent, or Firm* — Foley IP Law, PLLC

(57) ABSTRACT

Examples provide acceptance-based meeting insights and action recommendations associated with a meeting prior to a scheduled occurrence of the meeting using meeting invitee responses. A meeting insights manager analyzes meeting response data for meeting invitees a threshold time-period prior to the start time of the meeting. A score is generated based on the number of accept and decline responses received from the invitees. A meeting insights notification including a recommended action is generated and provided to the meeting organizer if the score indicates an insufficient number of invitees have accepted the meeting invitation. The recommendation includes a recommendation to cancel the meeting, reschedule the meeting and/or send a reminder to unresponsive meeting invitees. A recommendation to reschedule can include one or more proposed alternative meeting times for use in rescheduling the meeting. The recommendation is selected based on the amount of time remaining until the scheduled start of the meeting.

20 Claims, 12 Drawing Sheets

(56) References Cited

U.S. PATENT DOCUMENTS

| | | | |
|---|---|---|---|
| 2014/0278675 A1 | 9/2014 | Deluca et al. | |
| 2015/0193739 A1* | 7/2015 | Min | G06Q 10/06314 705/5 |
| 2016/0358126 A1 | 12/2016 | Bostick et al. | |
| 2018/0165656 A1 | 6/2018 | Tessler | |
| 2018/0330336 A1* | 11/2018 | Chittaluru | G06F 7/026 |
| 2018/0349860 A1* | 12/2018 | Siegel | G06Q 10/109 |
| 2020/0410453 A1* | 12/2020 | Nalliah | G06F 16/93 |
| 2021/0314375 A1* | 10/2021 | Sharma | H04L 65/4038 |

FOREIGN PATENT DOCUMENTS

| | | | | |
|---|---|---|---|---|
| EP | 3526749 A1 * | 8/2019 | ....... | G06F 16/24578 |
| WO | WO-2020185441 A1 * | 9/2020 | ............. | G06N 20/00 |

OTHER PUBLICATIONS

Saringer, Jim. CaSe-Categorical Scheduler. Diss. Freie Universität Berlin, 2017. (Year: 2017).*

Bell, Jason. Machine learning: hands-on for developers and technical professionals. John Wiley & Sons, 2020. (Year: 2020).*

"International Search Report and Written Opinion Issued in PCT Application No. PCT/US22/053906", Mailed Date: Apr. 5, 2023, 12 Pages.

"Viewing Invited Meeting Participants' Attendance Status", Retrieved from: https://web.archive.org/web/20211203184515/https:/support.zoom.us/hc/en-us/articles/4409428659725-Viewing-invited-meeting-participants-attendance-status-, Dec. 3, 2021, 4 Pages.

* cited by examiner

ACCEPTANCE-BASED MEETING INSIGHTS AND ACTION RECOMMENDATIONS

BACKGROUND

When a meeting organizer schedules a meeting including a number of invitees, the organizer generally receives a notification when one of the invitees accept or decline the meeting. However, the organizer needs to open the meeting event to see who accepted or declined the meeting before the meeting starts. If the organizer forgets to manually check on the invitee responses, one or more required people may not be present in the meeting. Moreover, the organizer may neglect to check the acceptances until it is time for the meeting to start. In such cases, the meeting may need to be canceled and rescheduled at the last minute. This is a time-consuming and inefficient process which can potentially waste the time of both the meeting organizer as well as the invited attendees.

SUMMARY

Some examples provide a system and method for a meeting insights manager providing meeting insights based on meeting invitee responses. The system includes a processor, a memory and the computer-readable instructions configured to cause the at least one processor to analyze meeting response data associated with a meeting having a plurality of invitees a threshold time-period prior to a scheduled occurrence of the meeting to generate an acceptance-based score. The meeting response data includes a number of invitees accepting a meeting invitation, a number of invitees declining the meeting invite and a number of unresponsive invitees. A time-remaining until a start time of the meeting is calculated. An acceptance-based score based on the number of invitees declining the meeting invite and the number of unresponsive invitees is calculated. The time-remaining is compared with a threshold minimum remaining time The meeting insights manager determines if the acceptance-based score is within a threshold range. If the score is outside the threshold range and the time-remaining is less than the threshold minimum remaining time, a meeting insights notification, including a recommended action, is generated. The recommended action includes a meeting cancel recommendation and/or a meeting reschedule recommendation. The meeting insights notification, including the recommended action, is sent to a user device associated with the meeting organizer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
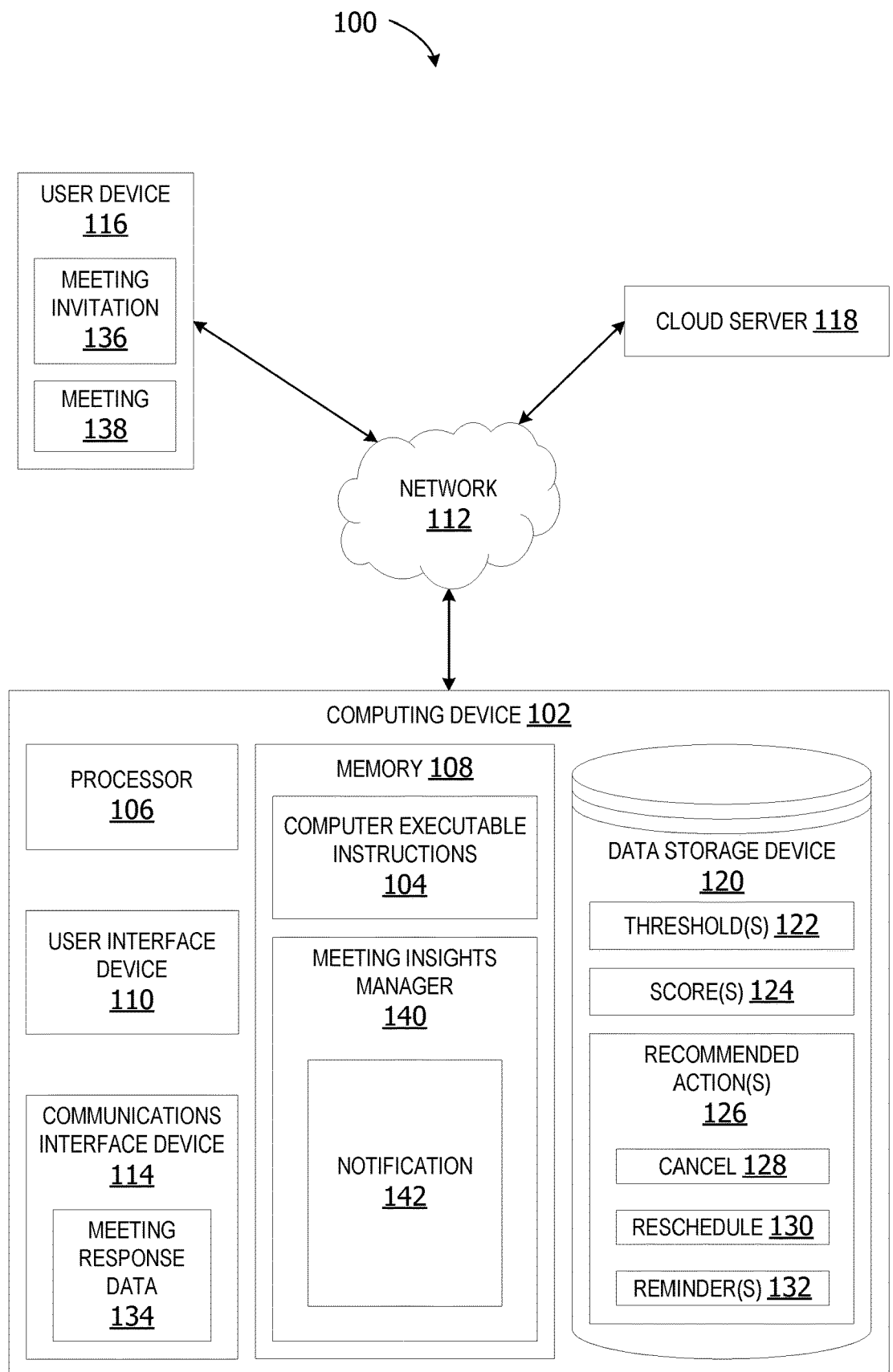
FIG. 1 is an exemplary block diagram illustrating a system for providing acceptance-based meeting insights and action recommendations.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Referring to the figures, examples of the disclosure provide meeting insights to a meeting organizer prior to the start of a meeting that indicate whether a scheduled meeting may be rescheduled or canceled, such as when there are not enough invitees that have accepted the meeting invitation. In some examples, a meeting insights manager generates one or more score(s), such as a percentage value, representing the acceptance rate, non-acceptance rate and/or non-responsive invitee rate for one or more meeting invitees prior to the start of the meeting. The score is compared to one or more threshold(s) used to determine if a meeting insights notification should be generated for the organizer. The notification includes a recommended action for the organizer to take based on the score(s). The notification is provided automatically to notify the organizer if an insufficient number of meeting invitees have accepted the meeting invitation a threshold minimum amount of time prior to the start of the meeting. In this manner, the organizer is alerted to the possible need to cancel the meeting, reschedule the meeting and/or send reminders to unresponsive invited attendees. The insights also give the organizer sufficient time to reschedule the meeting or send reminders prior to the meeting start time to avoid wasting the time of the organizer and invitees planning to attend the meeting.

Aspects of the disclosure further enable generation of meeting insights and action items regarding scheduled meetings, such as sending reminders to unresponsive invitees, canceling meetings and rescheduling meetings in advance. This improves user efficiency by providing automatic notifications, reminders and recommendations for rescheduling or canceling meetings that have an insufficient number of required invitees to accept the meeting invite.

Other aspects enable automatic reporting of a percentage of meeting acceptances, meeting declines and unresponsive invitees of meetings to a meeting organizer at a threshold time prior to a meeting scheduled start time. The meeting insights provide enhanced accuracy regarding meeting invitees likely to attend a meeting in advance, enabling an organizer sufficient time to send reminders or cancel and reschedule the meeting.

Still other examples enable a meeting insights manager that generates recommended dates and times for rescheduling a meeting based on availability of all the meeting invitees. The proposed meeting reschedule dates and/or times provided to the organizer enables more efficient and accurate rescheduling of meetings to dates and times which are likely to be accepted by a majority of invitees.

In some examples, the meeting insights manager runs automatically at a pre-determined time interval, such as, for example, daily before users' working hours start. By doing so, the insights manager analyzes all meetings that are scheduled in the coming day. This mode works well with other daily notification mechanisms, such as daily briefing emails and daily calendar updates.

In other examples, the meeting insights manager analyzes meeting data whenever the user schedules a new meeting. The meeting insights manager schedules a timer trigger (callback) a predetermined time-period before the meeting starts, such as twelve hours, six hours or a few hours before the meeting start time in some examples. When the timer callback is invoked, the meeting insights manager analyzes acceptance data for the target meeting and if there is any actionable insight generated, the assistant pushes the insight notification to the meeting organizer (user) through a notification channel, such as email, a data feed, a chat message, or any other notification method to provide timely notice of unaccepted meeting invites and action recommendations to address the issue.

In other examples, the meeting insights manager utilizes both triggering methods to obtain the desired triggering. In one example, the insights manager uses daily scheduled triggering for meetings scheduled one day or more in advance. In other examples, the insights manager uses call-back triggering for meetings scheduled within a day for improved flexibility and customization of insights notification generation.

Referring again to FIG. 1, an exemplary block diagram illustrates a system 100 for providing acceptance-based meeting insights and action recommendations. In the example of FIG. 1, the computing device 102 represents any device executing computer-executable instructions 104 (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 7, FIG. 8, FIG. 9, FIG. 10, and FIG. 11).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown).

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface device.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 120 for storing data, such as, but not limited to threshold(s) 122, score(s) 124 and/or recommended action(s) 126. The threshold(s) 122 includes one or more user-configurable thresholds, such as, but not limited to, a threshold maximum non-acceptance score, a threshold minimum acceptance score, a threshold minimum remaining time prior to a meeting occurrence, a threshold minimum time after meeting setup, or any other thresholds. A threshold in the threshold(s) 122 can include a default threshold, a user-configured threshold, a user updated threshold as well as a threshold which is automatically updated based on user-feedback.

In other examples, the threshold(s) 122 includes one or more threshold ranges. In some examples, the threshold(s) 122 include an acceptance-based score threshold range having a minimum acceptance threshold and/or a maximum non-acceptance threshold.

The score(s) 124 includes one or more acceptance-based scores. For example, the score(s) 124 can include an acceptance score indicating a level of acceptance of a meeting invitation by a set of meeting invitees, a non-acceptance score indicating a level of non-acceptance of a meeting invitation by a set of meeting invitees, as well as a score indicating a level of unresponsive invitees. A non-acceptance score is based on the number of invitees declining a meeting invitation. The non-acceptance score can also reflect the number of invitees both declining and failing to respond to a meeting invitation. An unresponsive invitee is a meeting attendee that has been invited to attend a meeting but has failed to respond to the meeting invitation. In other words, an unresponsive meeting invitee is an attendee that has not accepted or decline the invitation.

A recommended action in the recommended action(s) 126 includes one or more recommended actions for a meeting organizer. A recommended action is selected based on the score(s) for a given meeting. A recommended action includes a recommendation for the meeting organizer to cancel 128 a meeting prior to the planned start time of the meeting, reschedule 130 the meeting and/or a recommendation for the meeting organizer to send one or more reminder(s) 132 to one or more unresponsive invitees.

The data storage device 120 is not limited to storing thresholds, scores and/or recommendation options. The data storage device in other examples can also include meeting data, meeting response data meeting response data 134, user feedback data, historical meeting response data, or any other type of data. The meeting response data meeting response data 134 is data including the meeting invitation acceptance and declines from the invited meeting attendees that have responded to the meeting invitation 136.

In some example, a meeting invitation 136 is sent to an invited meeting attendee prior to a start of the planned meeting 138. The meeting invitation is optionally sent to an invitee via a user device associated with the invited meeting attendee, such as, but not limited to, the user device 116.

The data storage device 120 can include one or more different types of data storage devices, such as, for example, one or more rotating disks drives, one or more solid state drives (SSDs), and/or any other type of data storage device. The data storage device 120, in some non-limiting examples, includes a redundant array of independent disks (RAID) array. In other examples, the data storage device 120 includes a database.

The data storage device 120, in this example, is included within the computing device 102, attached to the computing device 102, plugged into the computing device 102, or otherwise associated with the computing device 102. In other examples, the data storage device 120 includes a remote data storage accessed by the computing device 102 via the network 112, such as a remote data storage device, a data storage in a remote data center, or a cloud storage.

The one or more threshold(s) 122 in this example is stored within the data storage device 120. In other examples, the threshold(s) 122 may be stored within one or more database(s) within the data storage device 120 and/or one or more database(s) within one or more other data storage devices(s).

The memory 108 in some examples stores one or more computer-executable components. Exemplary components include a meeting insights manager 140, which is executed by the processor 106. In some examples, the meeting insights manager 140 receives meeting response data meeting response data 134 from one or more meeting invitees. A meeting invitee is a primary invitee or secondary invitee included in a plurality of invitees for a scheduled meeting which has not yet taken place. An invitee may be referred to as a meeting attendee, meeting invitee, or meeting participant.

The meeting response data meeting response data 134 can be received as push-type data from a meeting-related application, such as, but not limited to, calendaring applications and/or email applications associated with the meeting organizer and/or the meeting invitees. In other words, the meeting insights manager receives the data automatically from one or more applications, cloud server or data store that sends or otherwise transmit the data to the meeting insights manager at a predetermined time interval.

In other examples, the meeting response data meeting response data 134 is obtained by the meeting insights manager 140 via a pull-type request. In other words, the meeting insights manager requests the data from one or more data sources when the data is needed. In these examples, the meeting insights manager 140 loads the meeting response data from one or more calendaring applications, email applications and/or any other application having the meeting response or meeting decline data indicating which invited attendees to have accepted or declined the meeting invitations.

In some examples, the meeting insights manager 140 analyzes the meeting response data meeting response data 134 for the plurality of meeting attendees (invitees) associated with the meeting 138. The analysis is performed a threshold time-period prior to a scheduled occurrence of the meeting 138. The plurality of invitees includes at least one primary invitee.

A primary invitee is an invitee prioritized for the purposes of obtaining an acceptance prior to the meeting start. A primary invitee can optionally be referred to as a required invitee or an invitee that is otherwise expected or desired to attend the planned meeting. A secondary invitee is an optional invitee that is not necessarily expected or required to attend. In other words, the meeting can likely go forward without one or more secondary invitees, however, the meeting organizer may not want to go forward with the meeting if one or more of the primary invitees does not accept the meeting.

The meeting response data, in these examples, includes the number of invitees accepting the meeting invitation 136 and/or the number of invitees declining the meeting invitation 136. The meeting response data meeting response data 134 in other examples also include the number of unresponsive invitees and/or the total number of meeting invitees invited to join the meeting. The total number of meeting invitees can include only primary invitees. In other examples, the total number of meeting invitees can include both primary and secondary invitees.

The meeting insights manager 140 in other examples, calculates a non-acceptance score associated with the number of invitees declining the meeting invitation and the number of unresponsive invitees. An unresponsive invitee is an invitee that fails to accept the meeting invitation, tentatively accept, decline the meeting invitation or otherwise make any response to the meeting invitation. The non-acceptance score is a score such as, but not limited to, the score(s) 124. The score is a value associated with non-acceptance of the meeting by one or more invitees. The score value, in some examples, is a percentage value, a ranking, a total number of non-accepting invitees out of the total number of invitees, or any other type of score.

The meeting insights manager 140 generates a meeting insights notification 142 including a recommended action, such as, but not limited to, the recommended action(s) 126. The recommended action is any recommendation for an action to be taken by the meeting organizer based on the non-acceptance score for the meeting. The recommended action can include a meeting cancel recommendation, a meeting reschedule recommendation and/or a recommendation to send out reminders to unresponsive invitees.

In some examples, a recommendation to cancel and/or reschedule the meeting 138 is provided to the meeting organizer if the non-acceptance score exceeds a threshold maximum score for non-accepting invitees and the amount of time left before the start of the meeting (time-remaining) is less than a threshold minimum remaining time. However, if the time-remaining prior to the meeting is greater than the threshold minimum remaining time, the recommendation is a send out reminder(s) 132 recommendation included with the notification.

If the recommendation is to reschedule the meeting, the meeting insights manager 140 generates one or more proposed dates and/or times to reschedule the meeting. In these examples, the meeting insights manager 140 analyzes meeting availability data indicating time slots in which each invitee is available to attend the meeting. The meeting insights manager 140 identifies one or more time slots (day and time) when all the meeting invitees or a threshold number of meeting invitees are available for a rescheduled meeting. In this manner, the meeting organizer can quickly and efficiently select a new date and time for the meeting 138 if the meeting organizer should decide to take the recommended action to cancel and/or reschedule the meeting 138 to a different day and/or time when a greater number of invitees are likely to be available to accept the meeting invitation 136.

The notification 142, including the recommendation, is output to the meeting organizer. In some examples, the notification 142 is provided via an email to the meeting organizer. In other examples, the notification 142 is provided via a chat message. In still other examples, the notification 142 is provided within a calendar application. In yet other examples, the notification 142 is presented to a user within a data feed or other pop-up notification via a user interface device on a user device associated with the meeting organizer.

In these examples, the notification 142 is transmitted to the meeting organizer via the network 112. In still other examples, the meeting organizer optionally views the notification on the computing device 102, such as via the user interface device 110.

Figure 2:
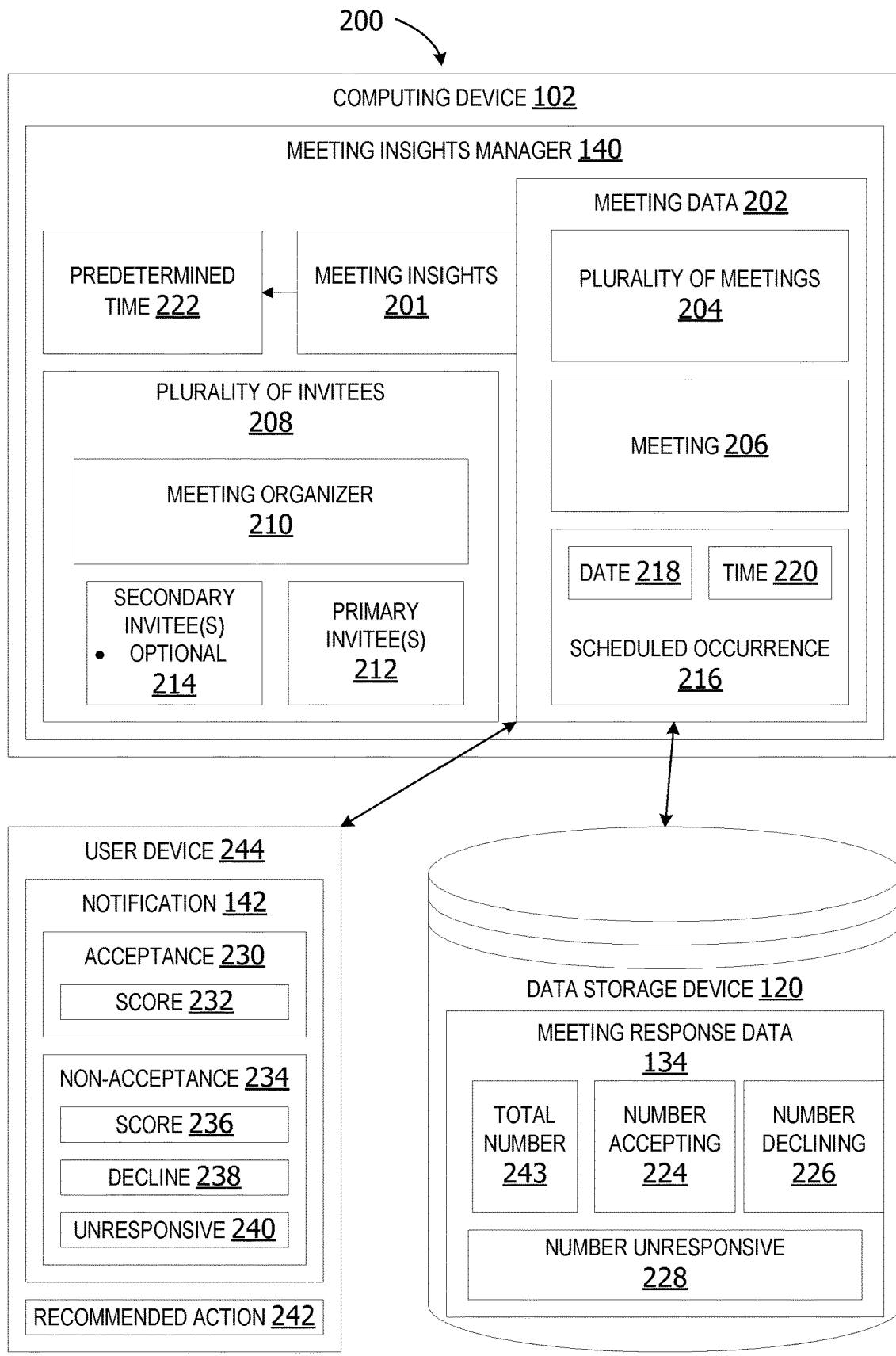
FIG. 2 is an exemplary block diagram illustrating the system for providing meeting insights notifications based on non-acceptance of meeting invitations.

Turning now to FIG. 2, an exemplary block diagram illustrating the system 200 for providing meeting insights 201 notifications based on non-acceptance of meeting invitations. A meeting insights 201 notification is a notification including meeting response data, such as, but not limited to, the number of invitees accepting or declining a meeting. The meeting response data is data such as, but not limited to, the meeting response data meeting response data 134 in FIG. 1. In some examples, the meeting response data includes one or more score(s) indicating a percentage of meeting invitees which have accepted and/or declined meeting invites, such as, but not limited to, the score(s) 124 in FIG. 1. The meeting insights 201 also includes one or more recommended actions, such as, but not limited to, the recommended actions 126 in FIG. 1.

In some examples, the meeting insights manager 140 analyzes meeting data 202 for a plurality of meetings 204. Each meeting 206 has a plurality of invitees 208. The plurality of invitees 208 includes a meeting organizer 210, one or more primary invitees(s) 212 and/or one or more secondary invitee(s) 214.

The scheduled meeting 206 has a scheduled occurrence 216 set by the meeting organizer 210. The schedule occurrence of the meeting is the schedule start time, including a date 218 and/or time 220.

At the occurrence of a pre-determined time 222, the meeting insights manager 140 analyzes the meeting response data meeting response data 134. The meeting response data meeting response data 134 in some examples includes a number of accepting 224 meeting invitees in the plurality of invitees 208 invited to attend the meeting 206, the number declining 226 the invitation and/or the number of unresponsive 228 invitees.

The meeting insights manager 140 generates one or more score(s) for the meeting based on the meeting response data meeting response data 134. In some examples, the meeting insights manager 140 generates an acceptance 230 score 232. The acceptance 230 score 232 is a score associated with the number of invitees that have already accepted the meeting invitation. The score 232 is a score, such as, but not limited to, a score in the score(s) 124 in FIG. 1. The acceptance score 232 is optionally provided as a percentage value, a ranking, a decimal value, or any other type of value indicating how many invitees out of the total number 243 of invited attendees accepted the meeting invitation.

In other examples, the meeting insights manager 140 generates a non-acceptance 234 score 236. The score 236 is a score calculated based on the number of invitees that decline 238 and/or unresponsive 240. An unresponsive 240 invitee is an invited invitee that failed to respond to the meeting invitation. In some examples, the score 236 is a score, such as, but not limited to, a score in the score(s) 124 in FIG. 1. The score is optionally provided as a percentage value, a ranking, a decimal value, or any other type of value.

The acceptance 230 score 232 and/or the non-acceptance 234 score 236 is utilized by the meeting insights manager 140 to generate a recommended action 242. In some examples, the notification is presented to the user via a user interface on a user device 244. The user device is a computing device associated with the meeting organizer. The user device in some examples is a device such as, but not limited to, the user device 116 in FIG. 1.

Figure 3:
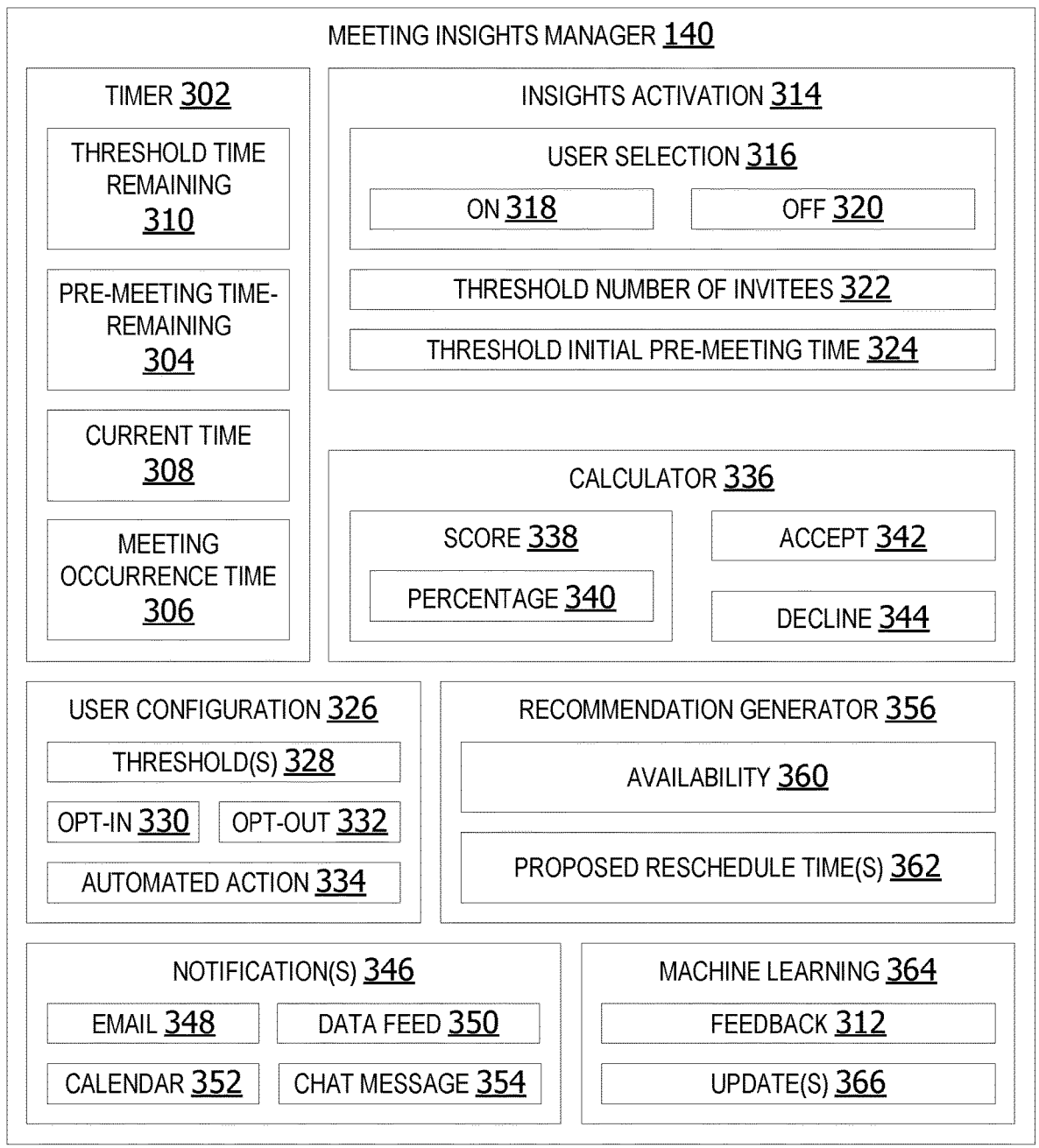
FIG. 3 is an exemplary block diagram illustrating a meeting insights manager for analyzing meeting response data to generate meeting insights notifications, including action recommendations.

FIG. 3 is an exemplary block diagram illustrating a meeting insights manager 140 for analyzing meeting response data to generate meeting insights notifications, including action recommendations. The meeting insights manager 140 is a software component or a combination hardware and software component that generates acceptance-based insights and recommendations for meeting organizers. In some examples, the meeting insights manager 140 includes a timer 302.

The timer 302, in this example, is a software component that determines a pre-meeting time-remaining 304 based on the planned meeting occurrence time 306 and the current time 308. The pre-meeting time-remaining 304 is the amount of time-remaining from the current time until the meeting is scheduled to begin. For example, if the meeting is scheduled to begin at 2:00 p.m. and the current time 308 is 8:00 a.m., then the pre-meeting time-remaining 304 is six hours until the meeting is scheduled to begin.

In other examples, the timer 302 uses the calculated pre-meeting time remaining 304 and compares it to a threshold time remaining 310 to determine if meeting response data should be analyzed by the meeting insights manager 140. In other words, the timer 302 determines if a trigger time has been reached at which the meeting insights manager should begin analyzing meeting data for purposes of generating acceptance-based notifications for a meeting organizer.

The threshold time remaining 310 used to trigger the meeting insights manager analysis in some examples is a default threshold. In other examples, it is a user-configured threshold value. In still other examples, the threshold is updated or adjusted based on user feedback 312 and/or user updated settings.

An insights activation 314 is a software component that determines whether a given meeting in the plurality of meetings is subject to analysis by the meeting insights manager 140. In some examples, the insights activation 314 checks a user-selection 316 for the given meeting. The user sets the user selection to "on" 318 to opt-in for the acceptance-based meeting insights. The opt-in is selected by the meeting organizer when the meeting organizer sets-up the meeting and chooses the invitees for the meeting. In these examples, the meeting insights is only applied to meetings which the user chooses to opt-in. The examples are not limited to referring to the opt-in as an "on" selection. The opt-in may also be referred to as an activation of the meeting insights, a selection of meeting insights, accepting meeting insights, or any other label for turning the meeting insights feature on.

In one example, the user opts-in during creation of a new meeting by selecting an option such as, a "Track invitee respond status" checkbox along with configurable decline rate threshold and check time. This enables per-user customization of meeting insight notifications.

In other examples, all meetings created by an organizer are automatically subject to the acceptance-based meeting insights. In these examples, a user can select an "off" 320 option to opt-out of the automatic application of the meeting insights analysis and notifications. The examples are not limited to referring to the opt-out as an "off" option. The opt-out may also be referred to as a cancellation of the meeting insights for a selected meeting, a de-activation of the meeting insights, decline meeting insights, or any other label for turning the meeting insights feature off for a selected meeting. In these examples, the opt-out is selected by the meeting organizer when the meeting organizer sets-up the meeting and chooses the date, time, and invitees for the meeting.

In other examples, the insights activation 314 applies the meeting insights to meetings having a threshold number of invitees 322. The threshold can specify a minimum number of invitees and/or a maximum number of invitees. If the number of invitees falls outside the threshold range, the insights activation automatically disqualifies the meeting for the meeting insights notifications. The meeting organizer does not receive notifications or recommendations for meetings which are disqualified or opted-out for meeting insights.

For example, if a threshold number of invitees 322 is thirty, the insights activation 314 de-activates the meeting insights for the given meeting if the given meeting has fifty invitees. In this example, due to the large number of invitees, recommendations to cancel or reschedule the meeting may be unnecessary due to the large number of potential attendees which have been invited to attend the meeting.

In other examples, the insights activation 314 disqualifies a meeting for meeting insights notifications if the meeting is scheduled to occur in less than a threshold initial pre-meeting time 324. The threshold initial pre-meeting time is a minimum amount of time from the time the meeting is set-up (created) until the meeting is scheduled to occur. For example, if the threshold initial pre-meeting time 324 is twenty-four hours, a meeting that is set-up to begin three hours after the meeting is initially created (set-up) is not qualified due to the insufficient amount of time between meeting creation and meeting occurrence.

The threshold initial pre-meeting time 324 is a default threshold in this example. In other examples, the threshold initial pre-meeting time 324 is a user-configured time.

User configuration 326 refers to the meeting organizer selecting parameters for the meeting insights notifications. In some examples, the user configuration includes configuration (user-selection) of one or more threshold(s) 328. The user configuration can also include the user opt-in 330 or opt-out 332 of the meeting insights for a selected meeting. In still other examples, the user can select automated action 334 for a given meeting. The automated action 334 refers to enabling the meeting insights manager 140 to automatically implement a recommended action without submitting the recommendation to the meeting organizer.

For example, the user can indicate that if a threshold number of invitees does not accept a meeting within a threshold time-period prior to the scheduled beginning of the meeting, the meting insights manager 140 should automatically reschedule (auto-reschedule) the meeting for an alternative date and time that is available for all the meeting invitees or an alternative meeting date/time that is available for a threshold number of the meeting invitees.

In other examples, a calculator 336 component calculates a score 338 indicating a percentage 340 of invitees to accept 342 a meeting. In other examples, the score 338 is a percentage 340 of invitees to decline 344 the meeting. The score 338 alternatively is a non-responsive score indicating the number of invitees that have not responded to the meeting invitation. The score 338 in still other examples is a non-acceptance score based on the number of invitees that have both declined the meeting invitation and the number of invitees that have failed to respond to the meeting invitation.

The meeting insights manager 140 generates one or more notification(s) 346 for one or more meeting organizers based on the score(s). The notification(s) 346 are provided to the meeting organizer via email 348, a data feed 350, a calendar 352 and/or a chat message 354. In some examples, the meeting insights notification(s) are output to the user as part of a daily insights application, such as, but not limited to, Microsoft® Viva Insights.

The notification(s) 346 include one or more recommendations generated by a recommendation generator 356. The recommendation generator 356 includes one or more recommended actions, such as, but not limited to, the recommended action(s) 126 in FIG. 1. The recommended action includes a recommendation to send reminders to the unresponsive invitees, cancel the meeting and/or reschedule the meeting. The recommendation generator 356 utilizes availability 360 data for the plurality of meeting invitees to identify one or more proposed reschedule time(s) 362.

In other examples, the meeting insights manager includes a machine learning 364. The machine learning utilizes user feedback 312 and pattern recognition to update 366 the threshold(s) and/or the recommendations provided to the meeting organizer(s). The user feedback 312 is feedback from the meeting organizer and/or the meeting invitees.

Figure 4:
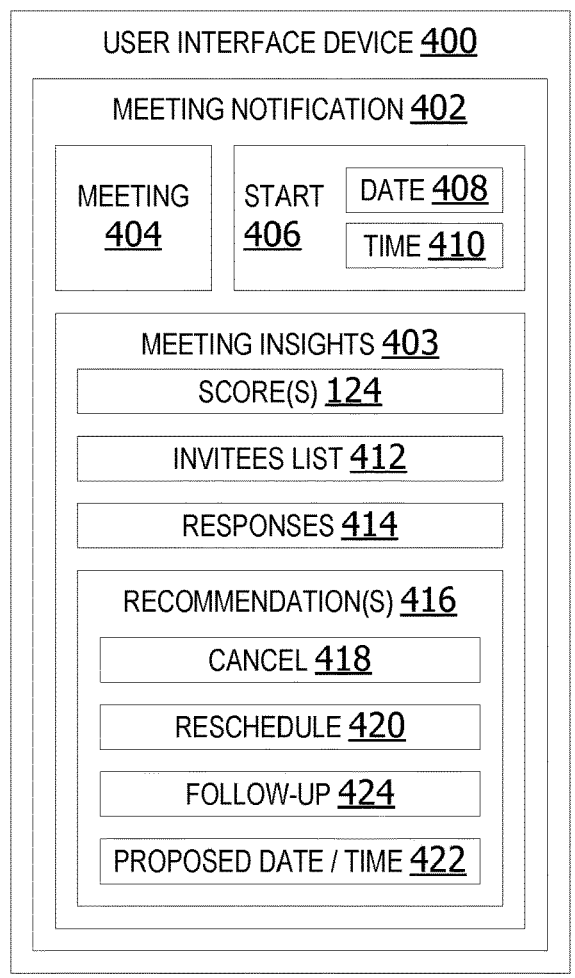
FIG. 4 is an exemplary block diagram illustrating a meeting notification presented to a user via a user interface.

FIG. 4 is an exemplary block diagram illustrating a meeting notification presented to a user via a user interface 400. The user interface is a device associated with a user device of a meeting organizer. The user interface device may be implemented as a device, such as, but not limited to, the user interface device 110 in FIG. 1. A meeting notification 402 generated by the meeting insights manager is output to the meeting organizer via the user interface device 400 in some non-limiting examples.

In this example, the meeting notification 402 is a meeting insights notification including meeting insights 403 associated with a given meeting 404 having a start 406 date 408 and time 410 setup by the meeting organizer.

In some examples, the meeting insights includes an invitees list 412 of the meeting invitees receiving a meeting invitation. The responses 414 for the invitees is provided. The responses indicates whether each invitee accepted, declined, or failed to respond (no response) to the meeting invitation for the meeting 404. The score(s) 124 generated by the meeting insights manager 140 is optionally also included in the meeting insights. However, in other examples, the score(s) 124 may not be included in the notification provided to the meeting organizer. In these examples, the score(s) are used by the meeting insights manager to generate the recommendations but not provided to the user.

The recommendation(s) 416 are included in the notification. The recommendation(s) 416 include a recommendation to cancel 418, reschedule 420 and/or follow-up 424 with invitees that have not yet responded to the meeting invitation. If the recommendation includes a reschedule 420 recommendation, the recommendation include a proposed date/time 422 for rescheduling the meeting.

Figure 5:
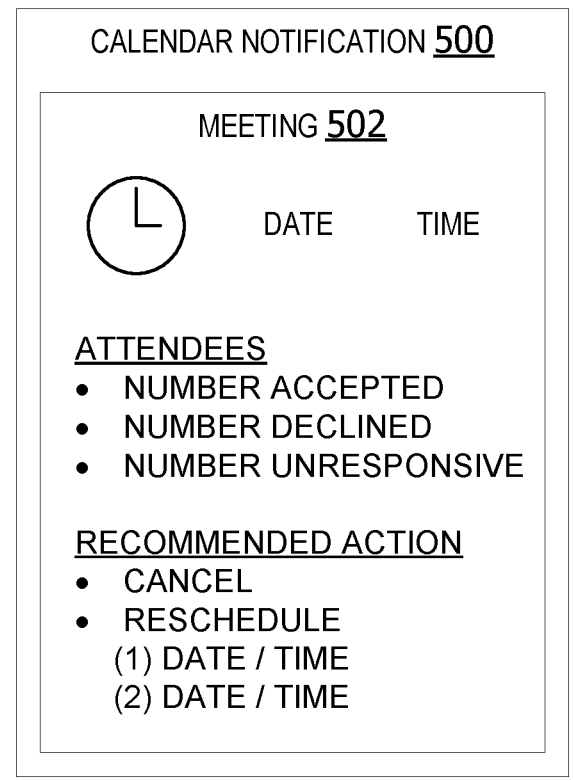
FIG. 5 is an exemplary block diagram illustrating a calendar notification including at least one action recommendation.

FIG. 5 is an exemplary block diagram illustrating a calendar notification 500 including at least one action recommendation for a meeting 502. In this non-limiting example, the notification including the meeting insights is provided to the meeting organizer via a calendaring application. The notification is presented to the user when the user opens the calendaring application and/or clicks on the meeting task in the calendar.

In this example, the calendar notification 500 includes a list of the invitees, the number of invitees that accepted, the number of invitees that did not respond, and/or the number that declined. The meeting insights also includes a recommended action. The recommended action in this example is a recommendation to cancel the meeting and reschedule to a first proposed date/time or a second proposed date/time. The user can select one of the two proposed dates and times or select a different date and time for rescheduling the meeting.

The meeting insights provided in the calendar notification 500 is one example of meeting insights output to a meeting organizer. However, the examples are not limited to the type of information, layout, appearance, or other graphics shown in the calendar notification 500. In other examples, a calendar notification or other meeting insights data output to a user may be provided in a different style, layout, appearance and/or include different types of information and/or different graphics. For example, the calendar notification could include an icon indicating too few invitees have accepted the meeting invitation, the score generated for the meeting acceptance or meeting declines by invitees, or any other meeting insights information.

Figure 6:
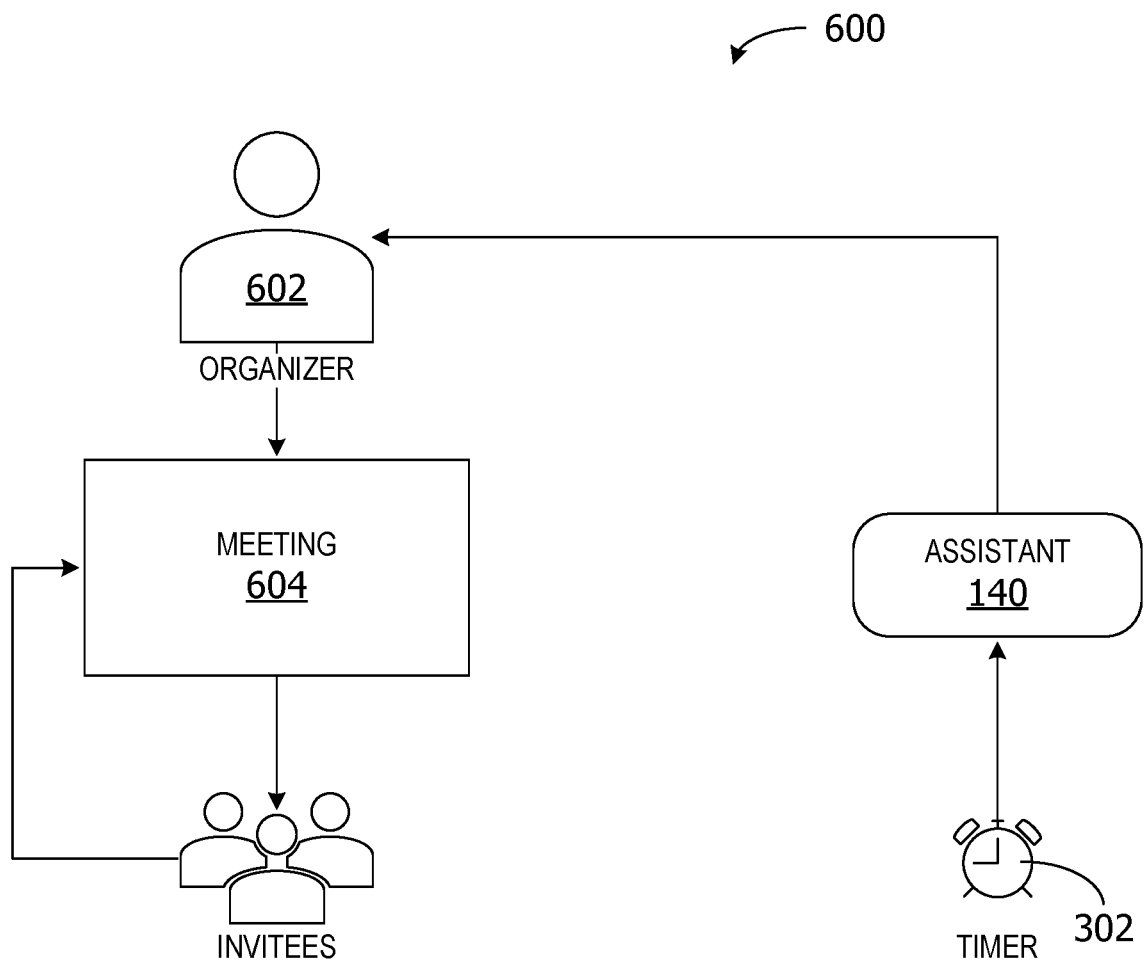
FIG. 6 is an exemplary flow diagram illustrating a meeting insights manager generating acceptance-based insights for a meeting organizer.

FIG. 6 is an exemplary flow diagram 600 illustrating a meeting insights manager generating acceptance-based insights for a meeting organizer 602. In this example, the meeting organizer 602 schedules a new meeting 604. The meeting invitation is sent to all invitees 606. Based on availability, invitees 606 either accept or decline the meeting 604. The responses are sent back to the meeting organizer 602. The responses may be sent via email, a calendaring application and/or a meeting application.

In this example, a time-based meeting insights manager 140 is triggered before the meeting starts by a timer 302 component. The meeting insights manager is a time-based meeting assistant process that analyzes the meeting data to figure out whether the meeting has enough invitees that have accepted the meeting. The meeting insights manager 140 generates actionable insights for the meeting organizer 602. The assistant delivers the insight to the meeting organizer 602. The meeting organizer 602 can follow one or more of the recommendations or take other proper action to resolve the problem indicated by the meetings insight notification.

Figure 7:
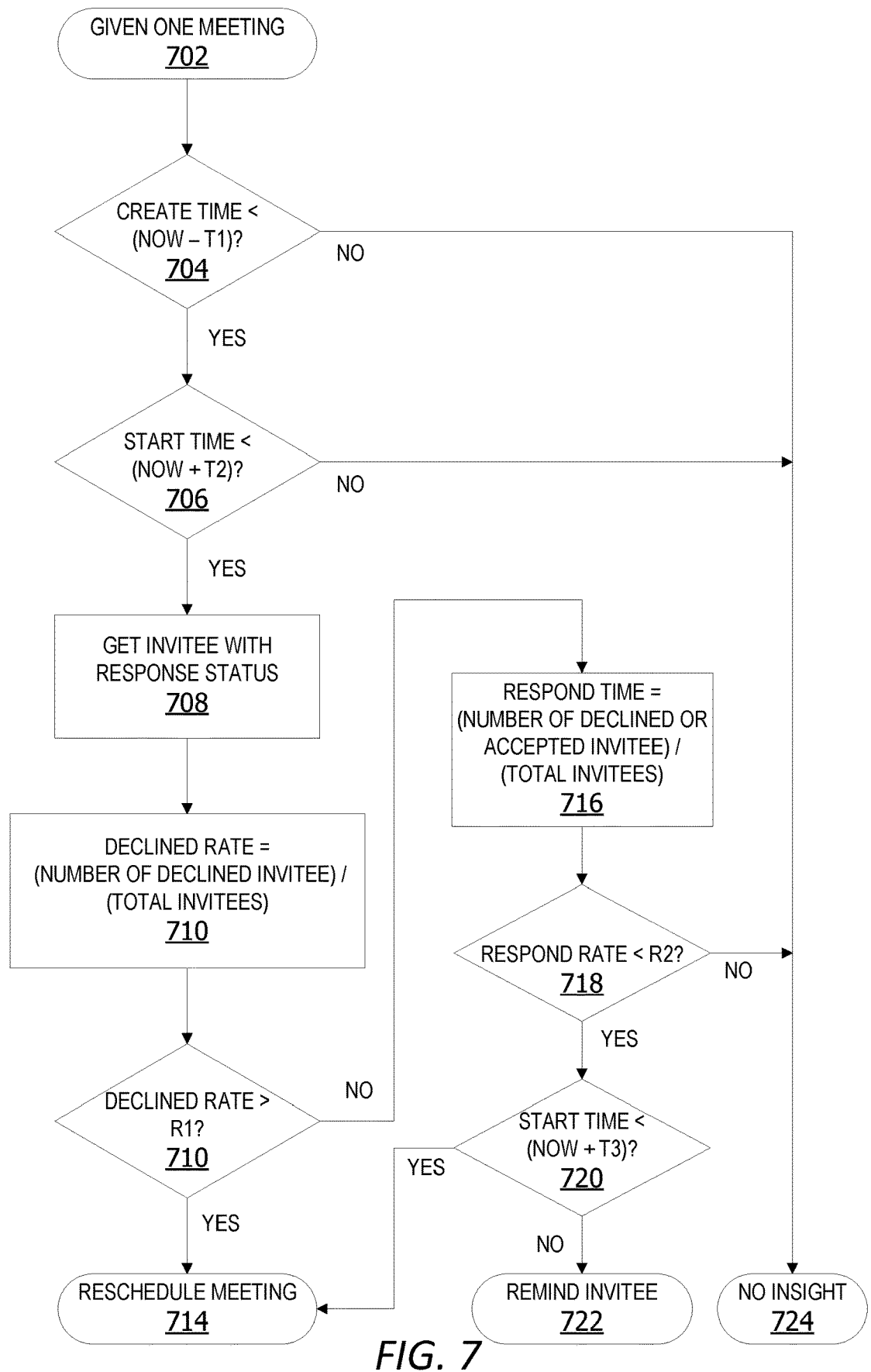
FIG. 7 is an exemplary flow chart illustrating operation of the computing device to generate a per-meeting insights and/or action recommendation(s).

FIG. 7 is an exemplary flow chart 700 illustrating operation of the computing device to generate a per-meeting insights and/or action recommendation(s). The process shown in FIG. 7 is performed by a meeting insights manager, executing on a computing device, such as the computing device 102 in FIG. 1 and/or the user device 116 in FIG. 1.

The process begins by selecting a meeting at 702. A meeting is optionally selected based on the amount of time remaining prior to the scheduled start of the meeting, whether the meeting organizer opted-in to receive meeting insight notifications for the meeting, whether the meeting was scheduled with enough time in advance to permit invited invitees to respond, the number of invited invitees, or other criteria to determine whether the meeting is subject to meetings insights analysis.

In this example, the meeting insights manager determines if the time since the meeting was created by the meeting organizer is less than the current time minus a threshold timespan (T1) at 704. This makes sure the meeting insights manager does not process a meeting which was just created, so that invitees have enough time to respond to this meeting. The threshold (T1) is a default threshold value which is also user configurable. Thus, the threshold T1 can be adjusted or customized on a per-user basis (for each meeting organizer) and/or customized on a per-meeting basis. The threshold can be customized for a single meeting, a series of meetings or all meetings occurring during a specific time-period. In one example, the first threshold (T1) is a value of twelve hours. In another example, the first threshold is a value of eighteen hours. In still other examples, the first threshold is eight hours or any other configurable time.

If there is sufficient time between the meeting creation and the scheduled meeting start time at 704, the meeting insights manager determines if the scheduled start time (meeting occurrence) of the meeting is less than the current time plus a second threshold (T2) value. The timespan (T2) is utilized to ensure the meeting insights manager does not process meetings that are scheduled to occur too far in the future as there may be little or no value in analyzing accept and decline data for a meeting that is not going to occur days, weeks or possibly months in the future. This ensures the meeting insights analysis does not take place until a reasonable amount of time prior to the scheduled start of the meeting without the analysis occurring too far ahead of the meeting start. In some non-limiting examples, the second threshold value T2 is twenty-four hours. In other examples, the value of T2 is forty-eight hours or thirty-six hours. In some examples, the threshold T2 may be referred to as a trigger time for trigger analysis of the meeting response data prior to the scheduled meeting occurrence time.

If the start time is within the threshold "trigger" time period (start time within the trigger threshold range), the meeting insights manager gets the list of invited attendees and the meeting response data (response data) for the invitees at 708. The meeting insights manager calculates the decline rate (non-acceptance score) as the number of declined invitees divided by the total number of invitees invited to attend the meeting at 710. In some examples, the declined rate (score) is calculated as the number of non-accepting primary invitees divided by the total number of primary invitees. In this example, optional (secondary) invitees are not taken into consideration. However, in other examples, the declined rate is calculated using acceptance and non-acceptance data for both primary and secondary invitees.

The meeting insights manager determines if the declined rate (score) is greater than a first threshold (R1). The first threshold is a threshold decline rate, above which the meeting is considered as having too many declines or failures to accept. In this examples, the first threshold is a percentage value. In one example, the threshold R1 is a fifty percent threshold decline rate. In other examples, the threshold R1 is a lower threshold of thirty percent, twenty percent, ten percent, or any other user-configurable threshold value. In still other examples, a user can choose a threshold of zero indicating that if even one primary invitee declines a notification is generated with a recommended action for the meeting organizer. In other words, the user can choose to receive notifications a threshold time prior to a meeting start if every primary invitee does not accept the meeting by the threshold time prior to the meeting start.

If the declined rate is greater than the threshold R1, the meeting insights manager recommends the meeting organizer reschedules the meeting 714. In other examples, the meeting insights manager automatically reschedules the meeting based on a user-selection of an automated action feature for this meeting.

If the declined rate is not greater than the threshold R1, the meeting insights manager calculates a respond rate at 716. The respond rate is a percentage of responses received from the invited attendees. The respond rate is calculated as the number of invitees accepting and declining the invitation divided by the total number of invitees. In other words, the number of all invitees that have responded to the meeting invitation is divided by the total number of invitees to get the respond rate. If the declined rate is above the threshold R1, the decline rate for the meeting is considered too high (too many declines). This threshold is also a user-configurable value. In some examples, the threshold is a percentage value, such as, but not limited to, thirty percent. However, it is not limited to thirty percent. The threshold R1 can be any user-configured value, such as, but not limited to, twenty percent, thirty-five percent, twelve percent, forty percent, or any other value.

The meeting insights manager determines if the respond rate is less than a second threshold (R2) for respond rate at 718. If the respond rate is below the threshold R2, the meeting is considered as having too few responses. The meeting insights manager determines if the meeting start time is less than the current time (now) plus a third threshold timespan (T3) at 720. This makes sure the meeting does not happen too soon otherwise, a reminder to meeting invitees to respond to the invitation is not useful or productive. In some examples, the value of T3 is a time period, such as, but not limited to, one hour. In other examples, the time T3 threshold can be three hours, six hours, thirty minutes, or any other user-configurable timespan.

If the start time is not too soon at 720, the meeting insights manager recommend the meeting organizer send out reminders to the meeting invitees that have not yet responded to the meeting invitation with an accept or decline at 722.

In some examples, if the invitee response (respond) rate is not less than the second threshold R2 at 718, no meeting insight is generated. Likewise, if the start time is too far away at 706, no meeting insight is generated at 724.

In other examples, the meeting insights manager defines different thresholds for primary (required) invitees and optional invitees. Specifically, the parameter R1 and R2 are split into four parameters targeting different kinds of invitees. And the calculation first targets all primary invitees only, then targets all invitees including both required and optional. If either of the threshold is exceeded, it will generate insight based on primary algorithm and stop processing.

In some examples, all the parameter values are configurable, and users can fine tune the values based on feedback from the meeting organizer and/or meeting invitees. Some parameters should be considered as configurable by users directly based on their preference rather than based on feedback only.

The output of the meeting insights manager algorithm results in several possible recommended actions. For example, the meeting insights manager in some examples recommends the meeting organizer cancel and/or reschedule the meeting if lots of invitees declined the meeting or it is too close to the meeting start time and there are not enough responses. Another insight for the organizer is to send reminder messages to invitees if very few invitees responded to the meeting so far and there is still sufficient time to obtain responses before the meeting start time. If there are no recommended actions, meeting insight notification is not sent to the organizer.

While the operations illustrated in FIG. 7 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 7.

Figure 8:
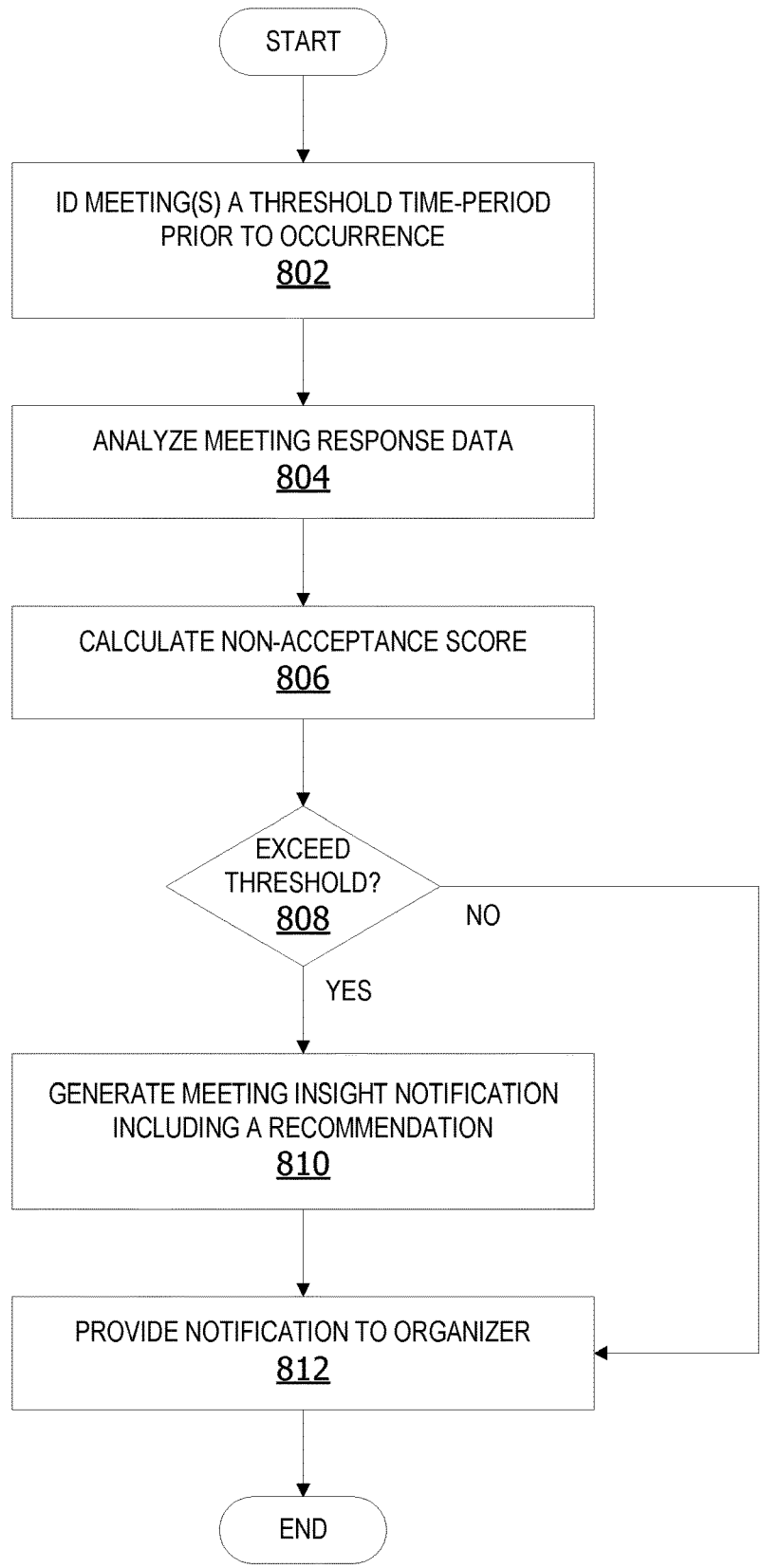
FIG. 8 is an exemplary flow chart illustrating operation of the computing device to provide acceptance-based notifications to meeting organizers.

FIG. 8 is an exemplary flow chart illustrating operation of the computing device to provide acceptance-based notifications to meeting organizers. The process shown in FIG. 8 is performed by a meeting insights manager, executing on a computing device, such as the computing device 102 in FIG. 1 and/or the user device 116 in FIG. 1.

The process begins by identifying one or more meeting(s) a threshold time-period prior to occurrence of the meeting start time at 802. After the meeting insights manager assistant process starts, the meeting insights manager identifies the meeting(s) in accordance with a triggering method. For example, the insights manager lists all meetings that will happen within a coming time-period, such as the coming day. Otherwise, the insights manager selects the meeting if the meeting insights manager assistant is triggered for a particular meeting, in which case, the meeting data for the particular meeting is loaded at the appropriate time.

In some examples, if the start of the meeting is too far off, the meeting is not eligible for meeting insights analysis. The meeting response data for the identified meeting(s) is analyzed at 804. The meeting insights manager calculates a non-acceptance score at 806. The meeting insights manager determines if the score exceeds the threshold at 808. If yes, meeting insight notification including a recommendation is generated at 810. A meeting insights notification is provided to the meeting organizer at 812. The process terminates thereafter.

While the operations illustrated in FIG. 8 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 8.

Figure 9:
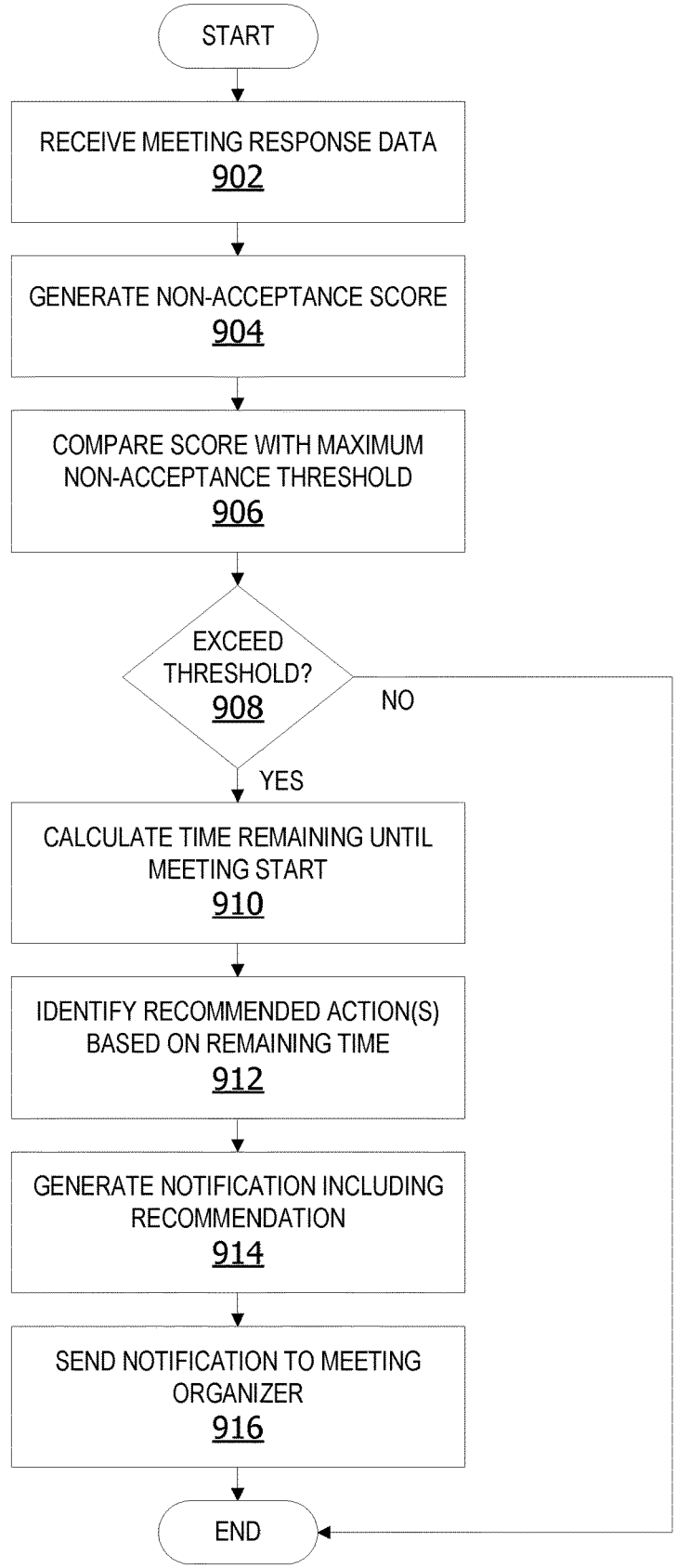
FIG. 9 is an exemplary flow chart illustrating operation of the computing device to identify recommended action(s) based on a remaining amount of time prior to a meeting start time.

FIG. 9 is an exemplary flow chart illustrating operation of the computing device to identify recommended action(s) based on a remaining amount of time prior to a meeting start time. The process shown in FIG. 9 is performed by a meeting insights manager, executing on a computing device, such as the computing device 102 in FIG. 1 and/or the user device 116 in FIG. 1.

The process begins by receiving meeting response data at 902. An acceptance score is generated at 904. The score is compared with a minimum acceptance threshold at 906. A determination is made whether the score exceeds the threshold at 908. If no, the meeting insights manager calculates remaining time until meeting start at 910. The meeting insights manager identifies recommended action(s) based on remaining time at 912. For example, if the time remaining is less than a minimum threshold, the recommendation is to cancel or reschedule. If the time remaining is greater than a threshold and some invitees have not responded, the recommendation is to send reminders to the unresponsive invitees. A notification is generated including the recommendation at 914. The notification is sent to the meeting organizer at 916. In some examples, the notification is provided to the organizer via an email, a calendar notification, a chat message, a data feed, or a pop-up notification. The process terminates thereafter.

While the operations illustrated in FIG. 9 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 9.

Figure 10:
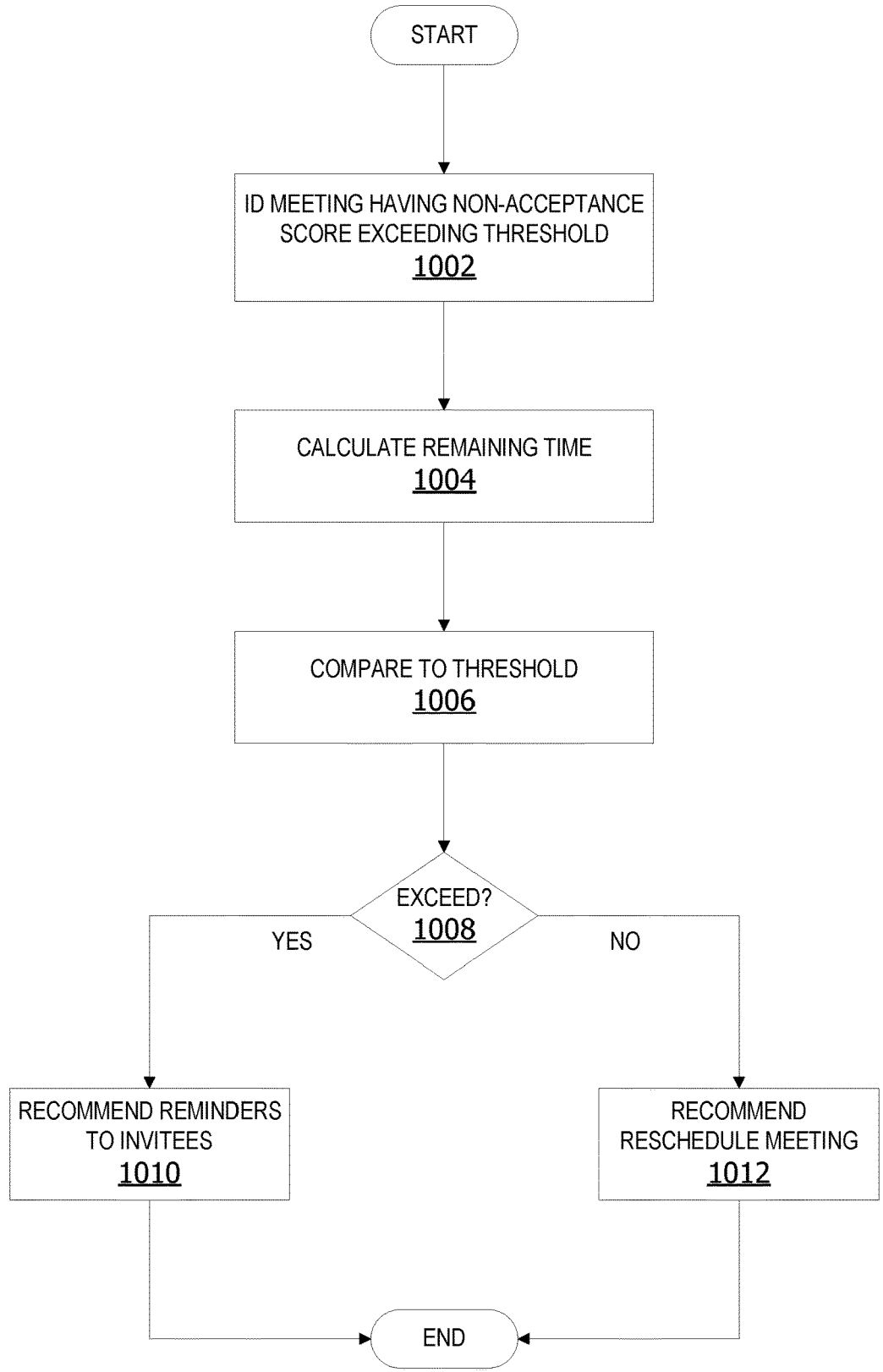
FIG. 10 is an exemplary flow chart illustrating operation of the computing device to determine whether to recommend meeting reminders or rescheduling a meeting.

FIG. 10 is an exemplary flow chart illustrating operation of the computing device to determine whether to recommend meeting reminders or rescheduling a meeting. The process shown in FIG. 10 is performed by a meeting insights manager, executing on a computing device, such as the computing device 102 in FIG. 1 and/or the user device 116 in FIG. 1.

The process begins by identifying a meeting having a non-acceptance score exceeding a threshold at 1002. The meeting insights manager calculates a remaining time until the meeting is scheduled to begin at 1004. The meeting insights manager compares the score to the threshold at 1006. The meeting insights manager determines if the remaining time exceeds the threshold at 1008. If yes, the meeting insights manager recommends the organizer send reminders to the invitees at 1010. If the remaining time is less than the threshold at 1008, the meeting insights manager recommends rescheduling the meeting at 1012. The process terminates thereafter.

While the operations illustrated in FIG. 10 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 10.

Figure 11:
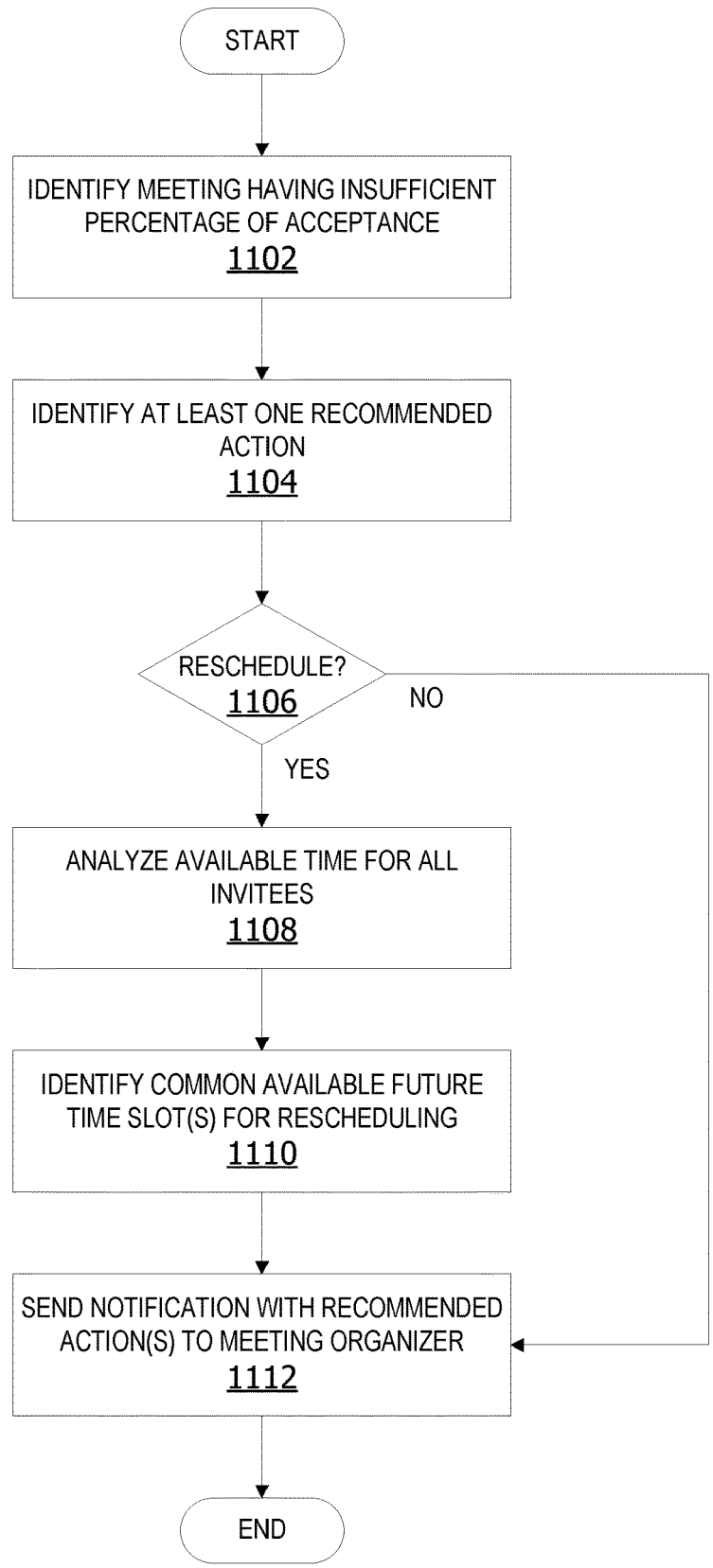
FIG. 11 is an exemplary flow chart illustrating operation of the computing device to generate proposed alternative meeting times for rescheduling a meeting.

FIG. 11 is an exemplary flow chart illustrating operation of the computing device to generate proposed alternative meeting times for rescheduling a meeting. The process shown in FIG. 11 is performed by a meeting insights manager, executing on a computing device, such as the computing device 102 in FIG. 1 and/or the user device 116 in FIG. 1.

The process begins by identifying a meeting having insufficient percentage of acceptances at 1102. The meeting insights manager identifies at least one recommended action at 1104. The meeting insights manager determines whether to recommend rescheduling of the meeting at 1106. If yes, the meeting insights manager analyzes available time for invitees at 1108. The meeting insights manager identifies common available future time slot(s) for rescheduling at 1110. The meeting insights manager sends a notification with recommended action(s) to the meeting organizer at 1112. The process terminates thereafter.

While the operations illustrated in FIG. 11 are performed by a computing device, aspects of the disclosure contemplate performance of the operations by other entities. In a non-limiting example, a cloud service on a cloud server performs one or more of the operations. The cloud server is a cloud server such as the cloud server 118 in FIG. 1. In another example, one or more computer-readable storage media storing computer-readable instructions may execute to cause at least one processor to implement the operations illustrated in FIG. 11.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

Additional Examples

In some examples, the meeting insights manager generates notification insights to organizer so that organizer can make in-time action to improve the meeting experience. The meeting insights manager is a background assistant that checks meeting invitees ahead of time. If there is a threshold percentage of required invitees that have not accepted the meeting by a threshold trigger date/time prior to the scheduled start of the meeting, the meeting insights manager delivers a meeting insight to the meeting organizer with a recommendation to send a reminder (ping invitees) or consider rescheduling the meeting.

In other examples, a meeting insights manager analyzes meeting invite acceptance data associated with a meeting having a plurality of invitees a threshold time-period prior to a scheduled occurrence of the meeting. The meeting insights manager calculates a non-acceptance invitee score associated with the number of invitees declining the meeting invite and the number of unresponsive invitees. The meeting insights manager generate a meeting insights notification recommending the organizer of the meeting cancel or reschedule the meeting in response to the non-acceptance invitee score exceeding a threshold score. The meeting insights manager provides the meeting insights notification to the organizer of the meeting, the meeting insights notification including a meeting reschedule date and time corresponding to an availability associated with a threshold number of invitees in the plurality of invitees.

In some examples, the notification including the actionable insights is delivered to the user via a periodic notification mechanism, such as, but not limited to, a daily briefing email sent every morning for subscribed users. The generated insights are included in the email so that the user is notified which meetings in the upcoming day (current day) should be rescheduled.

In other examples, the meeting insights notification(s) are displayed as an insight in the meeting event itself. For example, in an email application the notification data is obtained by user-selection of a meeting insights information icon in the calendar view for meetings that need attention. When the user clicks that meeting, a detailed insight message is shown.

In still other examples, the notification is provided through a push notification. In one example, the assistant drops a notification in the activity feed of the user. The user can view more details when the user clicks on the link or icon in the feed.

When the meeting insights manager, in some examples, suggests the organizer re-schedule the meeting, it can do one step further to query the free busy information for invitees and give one or two timeslots that allow the user to choose the best option from the proposed timeslots. This simplifies the reschedule experience and improves user convenience while reducing the likelihood of invitees declining the rescheduled meeting invitation. If the customer gets use to the suggested time and trust the suggested time, with user's consent, the meeting insights manager can automatically re-schedule the meeting on behalf of the organizer, so the experience become fully automated.

In other examples, there are certain meeting series that happen periodically and some of them are less important meetings to the organizer. In this case, it may become annoying or unnecessary to keep showing the reschedule meeting insights to the organizer. In such cases, the user can choose to exclude meetings in a meeting series from being analyzed by the meeting insights manager. The meeting insights manager checks a user-selection to determine if a given meeting is being excluded before analyzing in the first step.

When the meeting invite is sent to a group instead of individuals, the meeting insights manager expands the group to individuals to calculate the accurate decline rate and respond rate. Sometime, the meeting might invite be sent to large populations, this is usually a broadcasting scenario rather than a group discussion. This meeting should be excluded from analyzing. In such cases, before calculating the decline rate or respond rate, the meeting insights manager first tests if the population (primary invitee or all invitee) is greater than N (default to 50), and the insights manager stops processing the meeting data if the meeting invitee population is too big.

Alternatively, or in addition to the other examples described herein, examples include any combination of the following:
  wherein the recommended action includes a recommendation to send at least one reminder to at least one invitee responsive to the currently remaining time until the start of the meeting exceeding the threshold minimum remaining time;
  wherein the acceptance-based score is a non-acceptance score calculated based on both the number of invitees declining the meeting invitation and the number of unresponsive invitees failing to accept or decline the meeting invitation, and wherein the at least one notification threshold comprises a maximum non-acceptance threshold;
  wherein the acceptance-based score is an acceptance score calculated based on the number of invitees accepting the meeting invitation, and wherein the at least one notification threshold comprises a minimum acceptance threshold;
  wherein the plurality of invitees comprises at least one primary invitee and at least one secondary invitee;
  a first acceptance-based score associated with the at least one primary invitee in the plurality of invitees generated based on a number of primary invitees failing to accept the meeting invitation;
  a second non-acceptance score associated with the at least one secondary invitee in the plurality of invitees generated based on a number of secondary invitees failing to accept the meeting invitation;

wherein the first non-acceptance score associated with the at least one primary invitee is compared with a first non-acceptance threshold and the second non-acceptance score associated with the at least one secondary invitee is compared with a second non-acceptance threshold to determine whether to generate a recommended action for the meeting organizer;

wherein the first non-acceptance threshold is a different threshold value than the second non-acceptance threshold;

analyzing meeting response data associated with a meeting having a plurality of invitees a threshold time-period prior to a scheduled occurrence of the meeting to generate an acceptance-based score, the meeting response data comprising a number of invitees accepting a meeting invitation, a number of invitees declining the meeting invite and a number of unresponsive invitees failing to accept or decline the meeting invitation;

generating a meeting insights notification comprising a recommended action including at least one of a meeting cancel recommendation and a meeting reschedule recommendation in response to the acceptance-based score falling outside a threshold range and a threshold minimum remaining time exceeding a currently remaining time until a start time of the meeting;

selecting at least one proposed meeting reschedule date and time corresponding to an availability associated with a threshold number of invitees in the plurality of invitees responsive to the recommended action including the meeting reschedule recommendation;

sending the meeting insights notification, including the recommended action, to the meeting organizer;

generating the meeting insights notification including a recommendation to send at least one reminder to at least one invitee responsive to the currently remaining time until the start of the meeting exceeding the threshold minimum remaining time;

calculating the non-acceptance score based on the number of invitees declining the meeting invitation and the number of unresponsive invitees failing to accept or decline the meeting invitation, and wherein the at least one notification threshold comprises a maximum non-acceptance threshold;

calculating the invitee acceptance score based on the number of invitees accepting the meeting invitation, wherein the at least one notification threshold comprises a maximum non-acceptance threshold;

comparing a first non-acceptance score associated with at least one primary invitee in the plurality of invitees with a first non-acceptance threshold;

comparing a second non-acceptance score associated with at least one secondary invitee in the plurality of invitees with a second non-acceptance threshold to determine whether to generate a recommended action for the meeting, wherein the first non-acceptance threshold is a different threshold value than the second non-acceptance threshold;

automatically rescheduling the meeting to a proposed reschedule data and time responsive to user selection of an automated action function and the notification including a meeting reschedule recommendation;

checking an opt-out setting to determine if the meeting is excluded from analysis by the meeting insights manager;

excluding the meeting from analysis responsive to the user-selection of the opt-out setting;

checking an opt-in setting to determine if the meeting should be subject to analysis by the meeting insights manager;

analyzing the meeting response data by the meeting insights manager responsive to the user-selection of the opt-in setting;

checking a total number of invitees associated with the meeting;

excluding the meeting from analysis responsive to the total number of invitees exceeding a maximum threshold number of invitees.

At least a portion of the functionality of the various elements in FIG. 1, FIG. 2, FIG. 3, and FIG. 4 can be performed by other elements in FIG. 1, FIG. 2, FIG. 3 and FIG. 4, or an entity (e.g., processor 106, web service, server, application program, computing device, etc.) not shown in FIG. 1, FIG. 2, FIG. 3, and FIG. 4.

In some examples, the operations illustrated in FIG. 6, FIG. 7, FIG. 8, FIG. 9, FIG. 10, and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of generating acceptance-based meeting insights. The method including analyzing meeting response data associated with a meeting having a plurality of invitees a threshold time-period prior to a scheduled occurrence of the meeting to generate an acceptance-based score; generating a meeting insights notification comprising a recommended action including at least one of a meeting cancel recommendation and a meeting reschedule recommendation in response to the acceptance-based score falling outside a threshold range and a threshold minimum remaining time exceeding a currently remaining time until a start time of the meeting; selecting at least one proposed meeting reschedule date and time corresponding to an availability associated with a threshold number of invitees in the plurality of invitees responsive to the recommended action including the meeting reschedule recommendation; and sending the meeting insights notification, including the recommended action, to the meeting organizer.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Example Operating Environment

Figure 12:
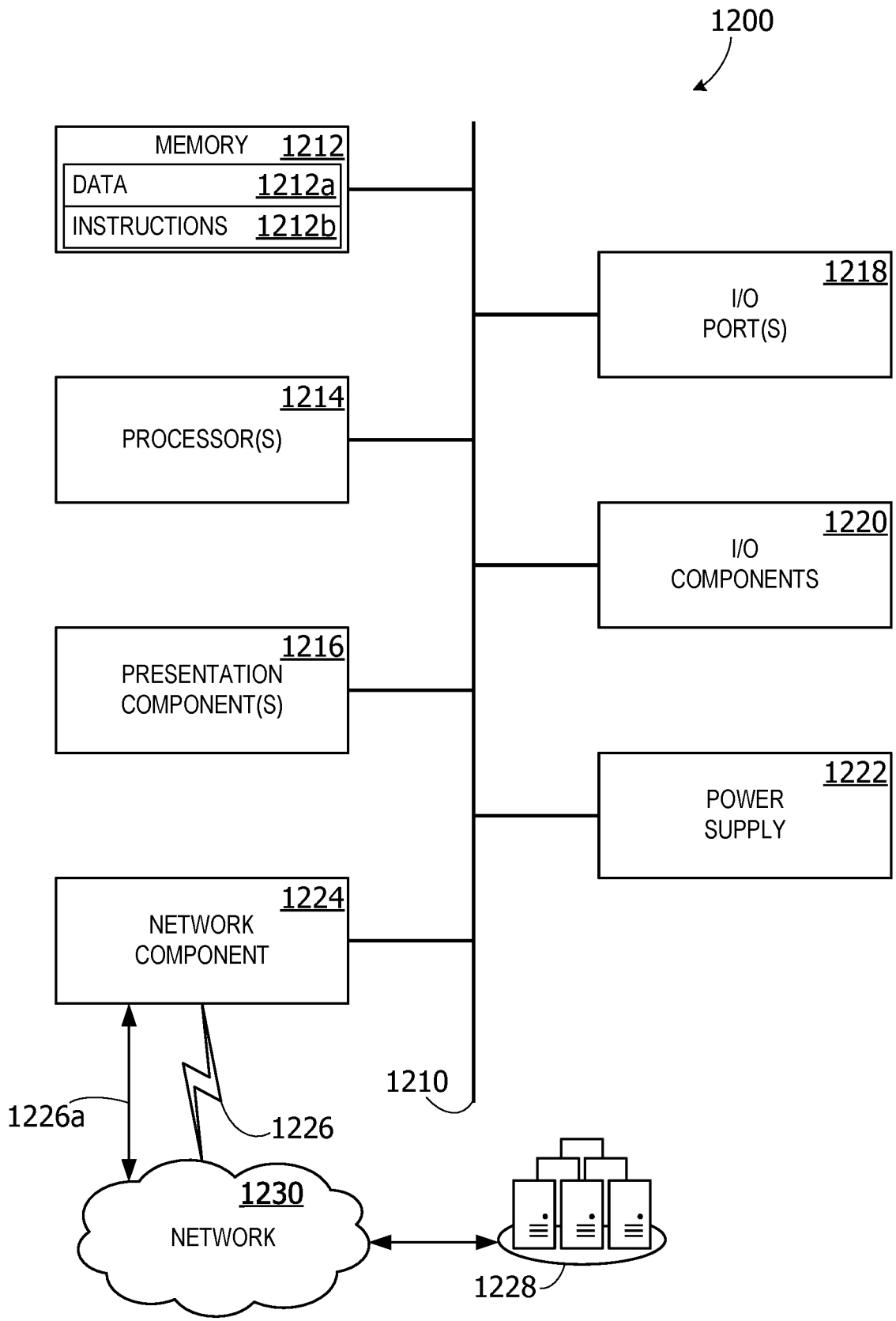
FIG. 12 is a block diagram of an example computing device for implementing aspects disclosed herein and is designated as computing device.

FIG. 12 is a block diagram of an example computing device 1200 for implementing aspects disclosed herein and is designated as computing device 1200. The computing device 1200 is a computing device, such as the computing device 102 in FIG. 1. The computing device 1200 is an example of a suitable computing environment and is not intended to suggest any limitation as to the scope of use or functionality of the examples disclosed herein. Neither should computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer-storage memory 1212, one or more processors 1214, one or more presentation components 1216, I/O ports 1218, I/O components 1220, a power supply 1222, and a network component 1224. While computing device 1200 is depicted as a single device, multiple computing devices 1200 may work together and share the depicted device resources. For example, memory 1212 may be distributed across multiple devices, and processor(s) 1214 may be housed with different devices.

Bus 1210 represents what may be one or more busses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device."

Memory 1212 may take the form of the computer-storage media references below and operatively provide storage of computer-readable instructions, data structures, program modules and other data for computing device 1200. In some examples, memory 1212 stores one or more of an operating system, a universal application platform, or other program modules and program data. Memory 1212 is thus able to store and access data 1212a and instructions 1212b that are executable by processor 1214 and configured to carry out the various operations disclosed herein.

In some examples, memory 1212 includes computer-storage media in the form of volatile and/or nonvolatile memory, removable or non-removable memory, data disks in virtual environments, or a combination thereof. Memory 1212 may include any quantity of memory associated with or accessible by computing device 1200. Memory 1212 may be internal to computing device 1200 (as shown in FIG. 12), external to computing device 1200 (not shown), or both (not shown).

Examples of memory 1212 in include, without limitation, RAM; read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1200. Additionally, or alternatively, memory 1212 may be distributed across multiple computing devices 1200, for example, in a virtualized environment in which instruction processing is carried out on multiple computing devices 1200. For the purposes of this disclosure, "computer storage media," "computer storage device," "computer-storage memory," "memory," and "memory devices" are synonymous terms for computer-storage memory 1212, and none of these terms include carrier waves or propagating signaling. In some examples, the memory 1212 is a memory such as, but not limited to, the memory 108 in FIG. 1.

Processor(s) 1214 may include any quantity of processing units that read data from various entities, such as memory 1212 or I/O components 1220 and may include CPUs and/or GPUs. Specifically, processor(s) 1214 are programmed to execute computer-executable instructions for implementing aspects of the disclosure. The instructions may be performed by the processor, by multiple processors within computing device 1200, or by a processor external to client computing device 1200. In some examples, processor(s) 1214 are programmed to execute instructions such as those illustrated in the in the accompanying drawings.

Moreover, in some examples, processor(s) 1214 represent an implementation of analog techniques to perform the operations described herein. For example, the operations may be performed by an analog client computing device 1200 and/or a digital client computing device 1200. In some examples, the processor(s) 1214 include one or more processors, such as but not limited to, the processor 106 in FIG. 1.

Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1218 allow computing device 1200 to be logically coupled to other devices including I/O components 1220, some of which may be built in. Example I/O components 1220 include, for example but without limitation, a microphone, joystick, game pad, satellite dish, scanner, printer, wireless device, etc.

Computing device 1200 may operate in a networked environment via network component 1224 using logical connections to one or more remote computers. In some examples, network component 1224 includes a network interface card and/or computer-executable instructions (e.g., a driver) for operating the network interface card. Communication between computing device 1200 and other devices may occur using any protocol or mechanism over any wired or wireless connection.

In some examples, network component 1224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1224 communicates over wireless communication link 1226 and/or a wired communication link 1226a to a cloud resource 1228 across network 1230. Various different examples of communication links 1226 and 1226a include a wireless connection, a wired connection, and/or a dedicated link, and in some examples, at least a portion is routed through the internet.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of", or "exactly one of" "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing meeting insights based on meeting invitee responses, the system comprising:
   at least one processor; and
   at least one memory comprising computer-readable instructions, the at least one processor, the at least one memory and the computer-readable instructions configured to cause the at least one processor to:
   obtain meeting response data from one or more data sources;
   identify a scheduled occurrence of a meeting associated with the meeting response data;
   responsive to the scheduled occurrence being within a threshold time-period, analyze the meeting response data associated with the meeting, the meeting having a plurality of invitees;
   generate an acceptance-based score based on the analysis of the meeting response data, the meeting response data comprising a number of invitees accepting a meeting invitation, a number of invitees declining the meeting invitation and a number of unresponsive invitees;
   determine, using machine learning and pattern recognition, whether the acceptance-based score is within a threshold range associated with a threshold minimum time remaining to the scheduled occurrence of the meeting, wherein the machine learning utilizes user feedback over time to update the threshold range;
   responsive to the acceptance-based score being outside the threshold range, generate a meeting insights notification comprising a recommended action, the recommended action including at least one of a cancel recommendation, a meeting reminder recommendation, and a reschedule recommendation, wherein the reschedule recommendation includes:
      one or more proposed time slots that correspond to available time slots for a threshold number of invitees, the one or more proposed time slots generated based on availability data for the plurality of invitees obtained from the one or more applications,
      a first user option between the one or more proposed time slots, and a second user option to override the one or more proposed time slots,
      wherein the second user option accepts as input a user provided time slot;
   transmit the meeting insights notification, including the recommended action, via a network to a user interface of a user device associated with a meeting organizer; and
   outputting the meeting insights notification, via the user interface, responsive to at least one of launching a calendaring application, selection of an icon via the user interface, or selection of the scheduled occurrence.

2. The system of claim 1, wherein the meeting insights notification further comprises at least one proposed meeting reschedule date and time corresponding to an availability associated with a threshold number of invitees in the plurality of invitees responsive to the recommended action including the reschedule recommendation.

3. The system of claim 1, wherein the acceptance-based score is a non-acceptance score calculated based on both the number of invitees declining the meeting invitation and the number of unresponsive invitees.

4. The system of claim 1, wherein the acceptance-based score is an acceptance score calculated based on the number of invitees accepting the meeting invitation, and wherein at least one threshold range comprises a minimum acceptance threshold.

5. The system of claim 1, wherein the plurality of invitees comprises at least one primary invitee and at least one secondary invitee, and further comprising:
   a first acceptance-based score associated with the at least one primary invitee in the plurality of invitees generated based on a number of primary invitees failing to accept the meeting invitation; and
   a second non-acceptance score associated with the at least one secondary invitee in the plurality of invitees generated based on a number of secondary invitees failing to accept the meeting invitation, wherein a first non-acceptance score associated with the at least one primary invitee is compared with a first non-acceptance threshold and the second non-acceptance score associated with the at least one secondary invitee is compared with a second non-acceptance threshold to determine whether to generate a recommended action for the meeting organizer, wherein the first non-acceptance threshold is a different threshold value than the second non-acceptance threshold.

6. A method for providing meeting insights based on meeting invitee responses, the method comprising:
   obtaining, by a processor, meeting response data from one or more data sources over a network;
   identifying, by the processor, a scheduled occurrence of a meeting associated with the meeting response data;
   responsive to the scheduled occurrence being within a threshold time-period, analyzing, by the processor, the meeting response data associated with the meeting, the meeting having a plurality of invitees;
   determining, by the processor using machine learning and pattern recognition, whether the acceptance-based score is within a threshold range associated with a threshold minimum time remaining to the scheduled occurrence of the meeting, wherein the machine learning utilizes user feedback over time to update the threshold range;
   responsive to the acceptance-based score being outside the threshold range, generating, by the processor, a meeting insights notification comprising a recommended action including at least one of a meeting cancel recommendation, a meeting reminder recommendation, and a meeting reschedule recommendation, wherein the reschedule recommendation includes:
- one or more proposed time slots that correspond to available time slots for a threshold number of invitees, the one or more proposed time slots generated based on availability data for the plurality of invitees obtained from the one or more applications,
- a first user option between the one or more proposed time slots, and
- a second user option to override the one or more proposed time slots, wherein the second user option accepts as an input a user provided time slot;

sending the meeting insights notification, including the recommended action, via the network to a user interface of a user device associated with a meeting organizer; and outputting the meeting insights notification, via the user interface, responsive to at least one of launching a calendaring application, selection of an icon via the user interface, or selection of the scheduled occurrence.

7. The method of claim 6, further comprising:
selecting at least one proposed meeting reschedule date and time corresponding to an availability associated with a threshold number of invitees in the plurality of invitees responsive to the recommended action including the meeting reschedule recommendation.

8. The method of claim 6, wherein the acceptance-based score is a non-acceptance score, and further comprising:
calculating the non-acceptance score based on the number of invitees declining the meeting invitation and the number of unresponsive invitees, and wherein the threshold range comprises a maximum non-acceptance threshold.

9. The method of claim 6, wherein the acceptance-based score is an invitee acceptance score, and further comprising:
calculating the invitee acceptance score based on the number of invitees accepting the meeting invitation, wherein the threshold range comprises a maximum non-acceptance threshold.

10. The method of claim 6, further comprising:
comparing a first non-acceptance score associated with at least one primary invitee in the plurality of invitees with a first non-acceptance threshold; and
comparing a second non-acceptance score associated with at least one secondary invitee in the plurality of invitees with a second non-acceptance threshold to determine whether to generate a recommended action for the meeting, wherein the first non-acceptance threshold is a different threshold value than the second non-acceptance threshold.

11. The method of claim 6, further comprising:
auto rescheduling the meeting to a proposed reschedule data and time responsive to user selection of an automated action function and the notification including a meeting reschedule recommendation.

12. The method of claim 6, further comprising:
checking an opt-out setting to determine if the meeting is excluded from analysis by a meeting insights manager; and
excluding the meeting from analysis responsive to a user-selection of the opt-out setting.

13. The method of claim 6, further comprising:
checking an opt-in setting to determine if the meeting should be subject to analysis by a meeting insights manager; and
analyzing the meeting response data by the meeting insights manager responsive to user-selection of the opt-in setting.

14. The method of claim 6, further comprising:
checking a total number of invitees associated with the meeting; and
excluding the meeting from analysis responsive to the total number of invitees exceeding a maximum threshold number of invitees.

15. The method of claim 6, further comprising:
generating the meeting insights notification including a recommendation to send at least one reminder to at least one invitee responsive to the time-remaining until the start of the meeting exceeding the threshold minimum remaining time.

16. A non-transitory computer readable storage devices having computer-executable instructions for providing meeting insights that, upon execution by a processor, cause the processor to at least:
obtain meeting response data from one or more data sources;
identify a scheduled occurrence of a meeting associated with the meeting response data;
responsive to the scheduled occurrence being within a threshold time-period, analyze the meeting response data associated with the meeting, the meeting having a plurality of invitees;
generate an acceptance-based score based on the analysis of the meeting response data, the meeting response data comprising a number of invitees accepting a meeting invitation, a number of invitees declining the meeting invitation and a number of unresponsive invitees;
determine, using machine learning and pattern recognition, whether the acceptance-based score is within a threshold range associated with a threshold minimum time remaining to the scheduled occurrence of the meeting, wherein the machine learning utilizes user feedback over time to update the threshold range;
responsive to the acceptance-based score being outside the threshold range, generate a meeting insights notification comprising a recommended action the recommended action including:
at least one of a meeting cancel recommendation, a meeting reminder recommendation, and a meeting reschedule recommendation, wherein the reschedule recommendation includes one or more proposed time slots that correspond to available time slots for a threshold number of invitees, the one or more proposed time slots generated based on availability data for the plurality of invitees obtained from the one or more applications,
a first user option between the one or more proposed time slots, and a second user option to override the one or more proposed time slots, wherein the second user option accepts as input a user provided time slot;
send the meeting insights notification, including the recommended action, via a network to a user interface of a user device associated with a meeting organizer; and
output the meeting insights notification, via the user interface, responsive to at least one of launching a calendaring application, selection of an icon via the user interface, or selection of the scheduled occurrence.

17. The non-transitory computer readable storage devices of claim 16, wherein the acceptance-based score is a non-acceptance score, wherein the computer-executable instructions are further executed by the processor to cause the processor to at least:
generate the meeting insights notification including a recommendation to send at least one reminder to at least one invitee responsive to the time-remaining until the start of the meeting exceeding the threshold minimum remaining time.

18. The non-transitory computer readable storage devices of claim 16, wherein the acceptance-based score is a non-acceptance score, wherein the computer-executable instructions are further executed by the processor to cause the processor to at least:
select at least one proposed meeting reschedule date and time corresponding to an availability associated with a threshold number of invitees in the plurality of invitees responsive to the recommended action including the meeting reschedule recommendation.

19. The non-transitory computer readable storage devices of claim 16, wherein the computer-executable instructions are further executed by the processor to cause the processor to at least:
compare a first non-acceptance score associated with at least one primary invitee in the plurality of invitees with a first non-acceptance threshold; and
compare a second non-acceptance score associated with at least one secondary invitee in the plurality of invitees with a second non-acceptance threshold to determine whether to generate a recommended action for the meeting, wherein the first non-acceptance threshold is a different threshold value than the second non-acceptance threshold.

20. The non-transitory computer readable storage devices of claim 16, wherein the computer-executable instructions are further executed by the processor to cause the processor to at least:
reschedule the meeting to a proposed reschedule data and time automatically responsive to user selection of an automated action function and the notification including a meeting reschedule recommendation.

* * * * *